US012206332B2

(12) United States Patent
Wang et al.

(10) Patent No.: US 12,206,332 B2
(45) Date of Patent: Jan. 21, 2025

(54) SYSTEMS AND METHODS FOR GENERATING CURRENTS WITH VARIABLE SLOPES FOR DC-TO-DC VOLTAGE CONVERTERS

(71) Applicant: ON-BRIGHT ELECTRONICS (SHANGHAI) CO., LTD., Shanghai (CN)

(72) Inventors: Fagang Wang, Shanghai (CN); Qiang Luo, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 87 days.

(21) Appl. No.: 17/885,099

(22) Filed: Aug. 10, 2022

(65) Prior Publication Data
US 2023/0049903 A1 Feb. 16, 2023

(30) Foreign Application Priority Data
Aug. 11, 2021 (CN) .......................... 202110918107.4

(51) Int. Cl.
*H02M 3/158* (2006.01)
*H02M 1/00* (2006.01)

(52) U.S. Cl.
CPC ....... *H02M 3/1582* (2013.01); *H02M 1/0009* (2021.05)

(58) Field of Classification Search
CPC .................................................. H02M 3/1582
See application file for complete search history.

(56) References Cited

U.S. PATENT DOCUMENTS 8,018,212 B1  9/2011 Petricek
8,664,982 B2  3/2014 Chen et al.
(Continued)

FOREIGN PATENT DOCUMENTS

CN  203135724 U  8/2013
CN  103546033 A  1/2014
(Continued)

OTHER PUBLICATIONS

Liu et al., "External ramp autotuning for current mode control of switching converters", 2013 Twenty-Eighth Annual IEEE Applied Power Electronics Conference and Exposition (APEC), 2013, pp. 276-280.
(Continued)

*Primary Examiner* — Peter M Novak
(74) *Attorney, Agent, or Firm* — Faegre Drinker Biddle & Reath LLP (57) ABSTRACT

System and method for generating one or more compensation currents for a DC-to-DC voltage converter. For example, a system for generating one or more compensation currents for a DC-to-DC voltage converter includes: a voltage generator configured to receive a reference voltage and generate a first ramp voltage and a second ramp voltage based at least in part on the reference voltage; and a current generator configured to receive the first ramp voltage, the second ramp voltage, an input voltage, and an output voltage; wherein the current generator is further configured to: if the output voltage is smaller than the input voltage, generate a first compensation current based at least in part on the first ramp voltage; and if the output voltage is larger than the input voltage, generate a second compensation current based at least in part on the second ramp voltage.

18 Claims, 5 Drawing Sheets

(56) References Cited

U.S. PATENT DOCUMENTS

| | | |
|---|---|---|
| 9,831,780 B2 | 11/2017 | Hong et al. |
| 2007/0296389 A1 | 12/2007 | Chen et al. |
| 2008/0303502 A1 | 12/2008 | Haiplik |
| 2009/0160416 A1 | 6/2009 | Kawagishi et al. |
| 2010/0164563 A1 | 7/2010 | Bea et al. |
| 2011/0187336 A1* | 8/2011 | Wu .................. G05F 1/10 323/282 |
| 2011/0241636 A1 | 10/2011 | Wu et al. |
| 2011/0279098 A1 | 11/2011 | Ren et al. |
| 2013/0328534 A1 | 12/2013 | Hsieh |
| 2014/0159686 A1 | 6/2014 | Lee et al. |
| 2015/0069958 A1 | 3/2015 | Yang et al. |
| 2018/0152105 A1 | 5/2018 | Ohyama et al. |
| 2019/0190280 A1 | 6/2019 | Chen et al. |
| 2019/0302818 A1 | 10/2019 | Liu et al. |
| 2019/0305666 A1* | 10/2019 | Yang .................. H02M 1/0009 |
| 2020/0274444 A1 | 8/2020 | Li |
| 2022/0209663 A1 | 6/2022 | Wang et al. |

FOREIGN PATENT DOCUMENTS

| | | |
|---|---|---|
| CN | 104092374 A | 10/2014 |
| CN | 105518968 A | 4/2016 |
| CN | 205583749 U | 9/2016 |
| CN | 111262435 A | 6/2020 |
| CN | 111610815 A | 9/2020 |
| CN | 112019048 A | 12/2020 |
| JP | 2006-033958 A | 2/2006 |
| JP | 2018-078533 A | 5/2018 |
| TW | 201301733 A | 1/2013 |
| TW | 201351861 A | 12/2013 |
| TW | 201539954 A | 10/2015 |

OTHER PUBLICATIONS

Taiwan Intellectual Property Office, Office Action issued Feb. 11, 2022, in Application No. 110111410.

Taiwan Intellectual Property Office, Office Action issued May 27, 2022, in Application No. 110114689.

China Patent Office, Office Action issued Feb. 6, 2024, in Application No. 202011568796.2.

China Patent Office, Office Action issued May 18, 2023, in Application No. 202110918107.4.

Liu, Pei-Hsin, "External Ramp Autotuning for Current Mode Control of Switching Converters," 2013 28th Annual IEEE Applied Power Electronics Conference and Exposition (APEC), 2013, pp. 276-280.

United States Patent and Trademark Office, Office Action issued Apr. 25, 2024, in U.S. Appl. No. 17/555,397.

United States Patent and Trademark Office, Notice of Allowance issued Sep. 18, 2024, in U.S. Appl. No. 17/555,397.

* cited by examiner

SYSTEMS AND METHODS FOR GENERATING CURRENTS WITH VARIABLE SLOPES FOR DC-TO-DC VOLTAGE CONVERTERS

1. CROSS-REFERENCES TO RELATED APPLICATIONS

This application claims priority to Chinese Patent Application No. 202110918107.4, filed Aug. 11, 2021, incorporated by reference herein for all purposes.

2. BACKGROUND OF THE INVENTION

Certain embodiments of the present invention are directed to circuits. More particularly, some embodiments of the invention provide systems and methods for generating currents with variable slopes for DC-to-DC voltage converters. Merely by way of example, some embodiments of the invention have been applied to buck-boost converters. But it would be recognized that the invention has a much broader range of applicability.

Conventional power supplies, such as adapter power supplies, automotive power supplies, and/or portable mobile power supplies, often need to generate output voltages that are above, below, or equal to corresponding input voltages. Usually, the conventional power supplies also need to provide a wide range of output voltages (e.g., 5-48 volts) and provide high output powers to corresponding loads (e.g., up to 240 watts), but such needs can pose significant design challenges for the power supplies. The power supplies often are implemented as power converters (e.g., DC-to-DC voltage converters).

Hence it is highly desirable to improve the technique for power converters.

3. BRIEF SUMMARY OF THE INVENTION

Certain embodiments of the present invention are directed to circuits. More particularly, some embodiments of the invention provide systems and methods for generating currents with variable slopes for DC-to-DC voltage converters. Merely by way of example, some embodiments of the invention have been applied to buck-boost converters. But it would be recognized that the invention has a much broader range of applicability.

According to some embodiments, a system for generating one or more compensation currents for a DC-to-DC voltage converter includes: a voltage generator configured to receive a reference voltage and generate a first ramp voltage and a second ramp voltage based at least in part on the reference voltage; and a current generator configured to receive the first ramp voltage, the second ramp voltage, an input voltage, and an output voltage; wherein the current generator is further configured to: if the output voltage is smaller than the input voltage, generate a first compensation current based at least in part on the first ramp voltage; and if the output voltage is larger than the input voltage, generate a second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage.

According to certain embodiments, a controller for a DC-to-DC voltage converter includes: a compensation current generator configured to receive a reference voltage, an input voltage and an output voltage and generate the first compensation current and the second compensation current based at least in part on the reference voltage, the input voltage and the output voltage; and a logic signal generator configured to generate one or more logic signals based on at least information associated with the first compensation current and the second compensation current; wherein the compensation current generator is further configured to: generate a first ramp voltage and a second ramp voltage based at least in part on the reference voltage; if the output voltage is smaller than the input voltage, generate the first compensation current based at least in part on the first ramp voltage; and if the output voltage is larger than the input voltage, generate the second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage.

According to some embodiments, a method for generating one or more compensation currents for a DC-to-DC voltage converter includes: receiving a reference voltage; generating a first ramp voltage and a second ramp voltage based at least in part on the reference voltage; receiving the first ramp voltage, the second ramp voltage, an input voltage, and an output voltage; if the output voltage is smaller than the input voltage, generating a first compensation current based at least in part on the first ramp voltage; and if the output voltage is larger than the input voltage, generating a second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage.

According to certain embodiments, a method for a DC-to-DC voltage converter includes: receiving a reference voltage, an input voltage and an output voltage; generating the first compensation current and the second compensation current based at least in part on the reference voltage, the input voltage and the output voltage; processing information associated with the first compensation current and the second compensation current; and generating one or more logic signals based on at least information associated with the first compensation current and the second compensation current; wherein the generating the first compensation current and the second compensation current based at least in part on the reference voltage, the input voltage and the output voltage includes: generating a first ramp voltage and a second ramp voltage based at least in part on the reference voltage; if the output voltage is smaller than the input voltage, generating the first compensation current based at least in part on the first ramp voltage; and if the output voltage is larger than the input voltage, generating the second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage.

Depending upon embodiment, one or more benefits may be achieved. These benefits and various additional objects, features and advantages of the present invention can be fully

5. DETAILED DESCRIPTION OF THE INVENTION

Certain embodiments of the present invention are directed to circuits. More particularly, some embodiments of the invention provide systems and methods for generating currents with variable slopes for DC-to-DC voltage converters. Merely by way of example, some embodiments of the invention have been applied to buck-boost converters. But it would be recognized that the invention has a much broader range of applicability.

Figure 1:
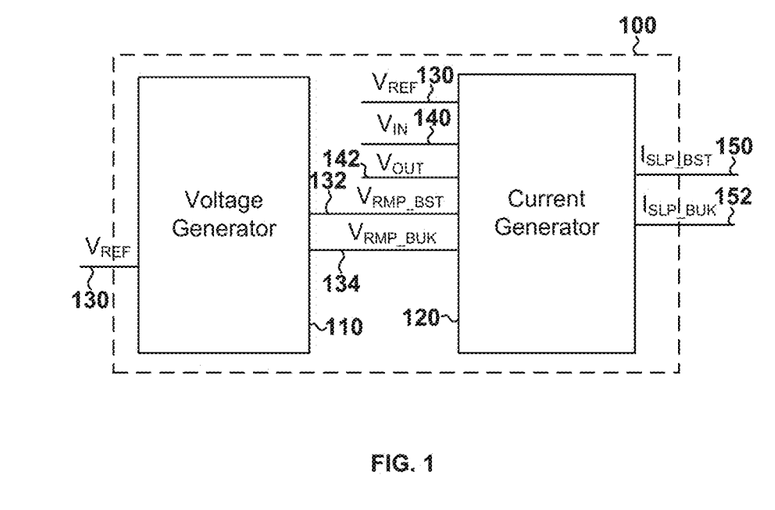
FIG. 1 is a simplified diagram showing a compensation current generator for a DC-to-DC voltage converter according to certain embodiments of the present invention.

FIG. 1 is a simplified diagram showing a compensation current generator for a DC-to-DC voltage converter according to certain embodiments of the present invention. This diagram is merely an example, which should not unduly limit the scope of the claims. One of ordinary skill in the art would recognize many variations, alternatives, and modifications. As shown in FIG. 1, the compensation current generator 100 includes a voltage generator 110 and a current generator 120. For example, the compensation current generator 100 is a system for generating one or more compensation currents for a DC-to-DC voltage converter. As an example, the DC-to-DC voltage converter is a buck-boost converter. Although the above has been shown using a selected group of components for the compensation current generator 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the compensation current generator 100 receives the reference voltage 130 (e.g., $V_{REF}$), the input voltage 140 (e.g., an input voltage of the DC-to-DC voltage converter), and the output voltage 142 (e.g., an output voltage of the DC-to-DC voltage converter), and generates the compensation current 150 (e.g., $I_{SLP\_BST}$) and the compensation current 152 (e.g., $I_{SLP\_BUK}$) based at least in part on the reference voltage 130 (e.g., $V_{REF}$), the input voltage 140 (e.g., an input voltage of the DC-to-DC voltage converter), and the output voltage 142 (e.g., an output voltage of the DC-to-DC voltage converter). For example, if the output voltage 142 (e.g., an output voltage of the DC-to-DC voltage converter) is larger than the input voltage 140 (e.g., an input voltage of the DC-to-DC voltage converter), the compensation current generator 100 generates the compensation current 150 (e.g., $I_{SLP\_BST}$) based at least in part on the reference voltage 130 (e.g., $V_{REF}$), wherein the compensation current 150 (e.g., $I_{SLP\_BST}$) flows out of the compensation current generator 100. As an example, if the output voltage 142 (e.g., an output voltage of the DC-to-DC voltage converter) is smaller than the input voltage 140 (e.g., an input voltage of the DC-to-DC voltage converter), the compensation current generator 100 generates the compensation current 152 (e.g., $I_{SLP\_BUK}$) based at least in part on the reference voltage 130 (e.g., $V_{REF}$), wherein the compensation current 152 (e.g., $I_{SLP\_BUK}$) flows into the compensation current generator 100.

In certain embodiments, the voltage generator 110 receives the reference voltage 130 (e.g., $V_{REF}$). For example, the reference voltage 130 (e.g., $V_{REF}$) is a predetermined voltage. As an example, the voltage generator 110 generates a ramp voltage 132 (e.g., $V_{RMP\_BST}$) based at least in part on the reference voltage 130 (e.g., $V_{REF}$). For example, the voltage generator 110 also generates a ramp voltage 134 (e.g., $V_{RMP\_BUK}$) based at least in part on the reference voltage 130 (e.g., $V_{REF}$).

In some embodiments, the current generator 120 receives the reference voltage 130 (e.g., $V_{REF}$), the ramp voltage 132 (e.g., $V_{RMP\_BST}$), the ramp voltage 134 (e.g., $V_{RMP\_BUK}$), the input voltage 140 (e.g., an input voltage of the DC-to-DC voltage converter), and the output voltage 142 (e.g., an output voltage of the DC-to-DC voltage converter). For example, the DC-to-DC voltage converter is a buck-boost converter. As an example, the buck-boost converter operates in the buck mode when the output voltage 142 is smaller than the input voltage 140, and the buck-boost converter operates in the boost mode when the output voltage 142 is larger than the input voltage 140.

In certain examples, the current generator 120 generates the compensation current 150 (e.g., $I_{SLP\_BST}$) based at least in part on the reference voltage 130 (e.g., $V_{REF}$), the ramp voltage 132 (e.g., $V_{RMP\_BST}$), the input voltage 140 (e.g., an input voltage of the DC-to-DC voltage converter), and the output voltage 142 (e.g., an output voltage of the DC-to-DC voltage converter). For example, if the output voltage 142 (e.g., an output voltage of the DC-to-DC voltage converter) is larger than the input voltage 140 (e.g., an input voltage of the DC-to-DC voltage converter), the current generator 120 generates the compensation current 150 (e.g., $I_{SLP\_BST}$) based at least in part on the reference voltage 130 (e.g., $V_{REF}$) and the ramp voltage 132 (e.g., $V_{RMP\_BST}$). As an example, the compensation current 150 (e.g., $I_{SLP\_BST}$) changes (e.g., increases) with a variable slope. For example, the slope of the compensation current 150 (e.g., $I_{SLP\_BST}$) changes with the ramp voltage 132 (e.g., $V_{RMP\_BST}$).

In some examples, the current generator 120 also generates the compensation current 152 (e.g., $I_{SLP\_BUK}$) based at least in part on the reference voltage 130 (e.g., $V_{REF}$), the ramp voltage 134 (e.g., $V_{RMP\_BUK}$), the input voltage 140 (e.g., an input voltage of the DC-to-DC voltage converter), and the output voltage 142 (e.g., an output voltage of the DC-to-DC voltage converter). For example, if the output voltage 142 (e.g., an output voltage of the DC-to-DC voltage converter) is smaller than the input voltage 140 (e.g., an input voltage of the DC-to-DC voltage converter), the current generator 120 generates the compensation current 152

(e.g., $I_{SLP\_BUK}$) based at least in part on the reference voltage 130 (e.g., $V_{REF}$) and the ramp voltage 134 (e.g., $V_{RMP\_BUK}$). As an example, the compensation current 152 (e.g., $I_{SLP\_BUK}$) changes (e.g., decreases) with a variable slope. For example, the slope of the compensation current 152 (e.g., $I_{SLP\_BUK}$) changes with the ramp voltage 134 (e.g., $V_{RMP\_BUK}$).

According to certain embodiments, the compensation current 150 (e.g., $I_{SLP\_BST}$) changes with time at a slope. For example, the slope changes in response to the change of magnitude of the ramp voltage 132 (e.g., $V_{RMP\_BST}$). As an example, the magnitude of the ramp voltage 132 (e.g., $V_{RMP\_BST}$) changes with time, and the slope of the compensation current 150 (e.g., $I_{SLP\_BST}$) also changes with time. In certain embodiments, the compensation current 152 (e.g., $I_{SLP\_BUK}$) changes with time at a slope. For example, the slope changes in response to the change of magnitude of the ramp voltage 134 (e.g., $V_{RMP\_BUK}$). As an example, the magnitude of the ramp voltage 134 (e.g., $V_{RMP\_BUK}$) changes with time, and the slope of the compensation current 152 (e.g., $I_{SLP\_BUK}$) also changes with time.

Figure 2:
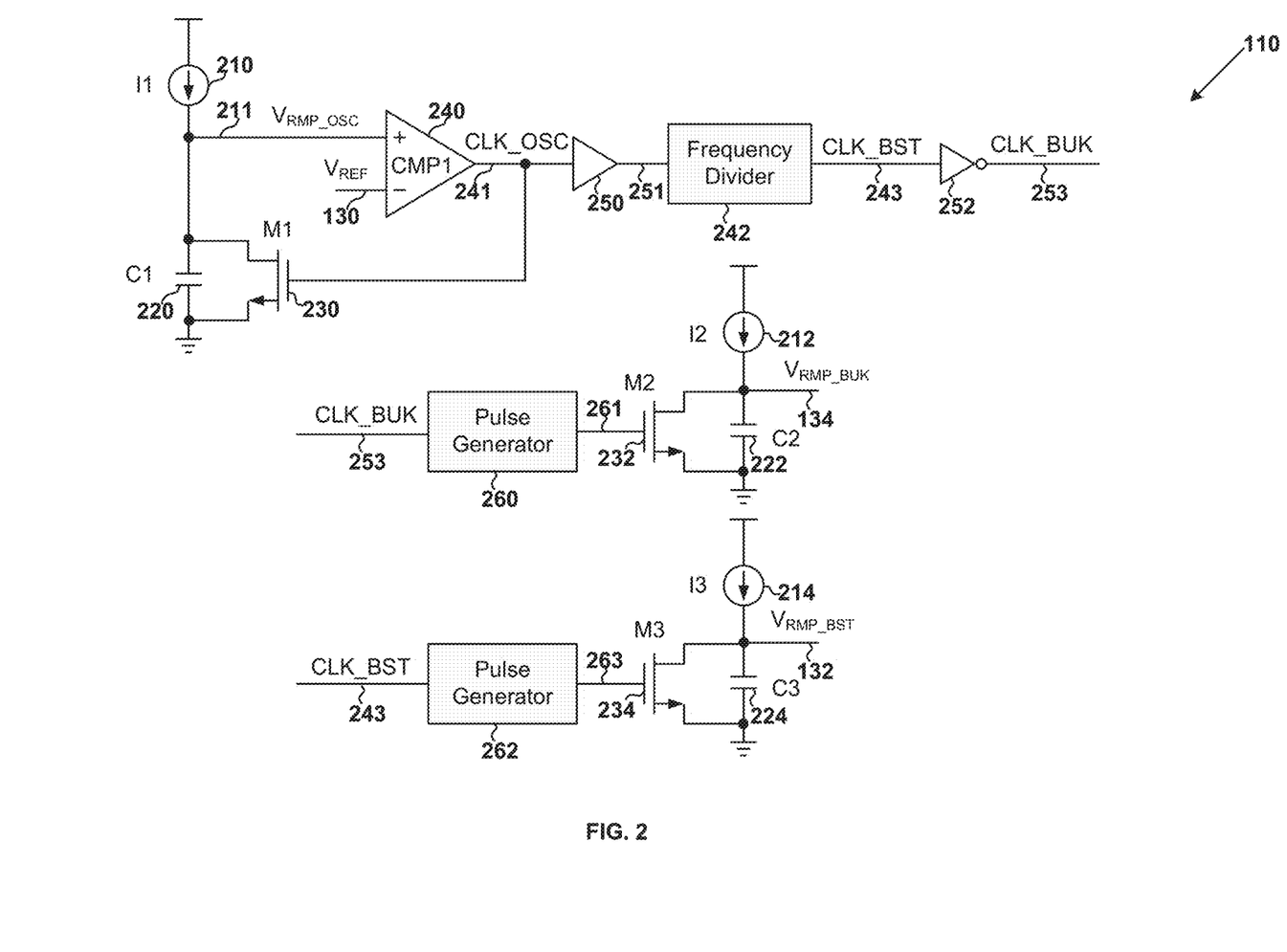
FIG. 2 is a simplified diagram showing the voltage generator as part of the compensation current generator as shown in FIG. 1 for a DC-to-DC voltage converter according to some embodiments of the present invention.

FIG. 2 is a simplified diagram showing the voltage generator 110 as part of the compensation current generator 100 as shown in FIG. 1 for a DC-to-DC voltage converter according to some embodiments of the present invention. This diagram is merely an example, which should not unduly limit the scope of the claims. One of ordinary skill in the art would recognize many variations, alternatives, and modifications. As shown in FIG. 2, the voltage generator 110 includes a current source 210 (e.g., I1), a current source 212 (e.g., I2), a current source 214 (e.g., I3), a capacitor 220 (e.g., C1), a capacitor 222 (e.g., C2), a capacitor 224 (e.g., C3), a transistor 230 (e.g., M1), a transistor 232 (e.g., M2), a transistor 234 (e.g., M3), a comparator 240, a frequency divider 242, a buffer 250, a NOT gate 252, and one-shot pulse generators 260 and 262. Although the above has been shown using a selected group of components for the voltage generator 110, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, a clock signal 241 (e.g., CLK_OSC) is received by a gate terminal of the transistor 230 (e.g., M1) to turn on and/or turn off the transistor 230 (e.g., M1) in order to generate a ramp voltage 211 (e.g., $V_{RMP\_OSC}$). In some examples, if the clock signal 241 is at a logic high level, the transistor 230 (e.g., M1) is turned on, and if the clock signal 241 is at a logic low level, the transistor 230 (e.g., M1) is turned off. For example, if the transistor 230 (e.g., M1) is turned off by the clock signal 241, the current source 210 (e.g., I1) charges the capacitor 220 (e.g., C1) and the ramp voltage 211 (e.g., $V_{RMP\_OSC}$) increases with time. As an example, if the transistor 230 (e.g., M1) is turned on by the clock signal 241, the capacitor 220 (e.g., C1) is discharged and the ramp voltage 211 (e.g., $V_{RMP\_OSC}$) decreases with time. In certain examples, the ramp voltage 211 (e.g., $V_{RMP\_OSC}$) is received by a non-inverting input terminal (e.g., the "+" terminal) of the comparator 240, which also includes an inverting input terminal (e.g., the "−" terminal) and an output terminal. For example, the inverting input terminal (e.g., the "−" terminal) of the comparator 240 receives the reference voltage 130 (e.g., $V_{REF}$). As an example, the comparator 240 generates the clock signal 241 based at least in part on the reference voltage 130 (e.g., $V_{REF}$) and the ramp voltage 211 (e.g., $V_{RMP\_OSC}$) and outputs the clock signal 241 at the output terminal. In some examples, the frequency of the clock signal 241 equals the frequency of the ramp voltage 211 (e.g., $V_{RMP\_OSC}$).

According to some embodiments, the clock signal 241 is received by the buffer 250, which in response generates a signal 251. For example, the signal 251 is a periodic signal (e.g., a clock signal). As an example, the frequency of the clock signal 251 equals the frequency of the clock signal 241. In certain examples, the signal divider 242 receives the signal 251 and generates a signal 243 (e.g., CLK_BST) based at least in part on the signal 251. For example, the signal 243 (e.g., CLK_BST) is a periodic signal (e.g., a clock signal). As an example, the frequency of the signal 243 (e.g., CLK_BST) equals half of the frequency of the clock signal 251. In some examples, the signal 243 (e.g., CLK_BST) is received by the NOT gate 252, which in response generates a signal 253 (e.g., CLK_BUK). For example, the frequency of the signal 253 (e.g., CLK_BUK) equals the frequency of the signal 243 (e.g., CLK_BST). As an example, if the signal 243 (e.g., CLK_BST) is at the logic high level, the signal 253 (e.g., CLK_BUK) is at the logic low level, and if the signal 243 (e.g., CLK_BST) is at the logic low level, the signal 253 (e.g., CLK_BUK) is at the logic high level.

In certain embodiments, the signal 253 (e.g., CLK_BUK) is received by the one-shot pulse generator 260, which in response generates a signal 261. For example, if the signal 253 (e.g., CLK_BUK) changes from the logic low level to the logic high level, the one-shot pulse generator 260 changes the signal 261 from the logic low level to the logic high level, keeps the signal 261 at the logic high level for a predetermined time duration, and then changes the signal 261 back to the logic low level. In some examples, if the signal 261 is at the logic high level, the transistor 232 (e.g., M2) is turned on, and if the signal 261 is at the logic low level, the transistor 232 (e.g., M2) is turned off. For example, if the transistor 232 (e.g., M2) is turned off by the signal 261, the current source 212 (e.g., I2) charges the capacitor 222 (e.g., C2) and the ramp voltage 134 (e.g., $V_{RMP\_BUK}$) increases with time. As an example, if the transistor 232 (e.g., M2) is turned on by the signal 261, the capacitor 222 (e.g., C2) is discharged and the ramp voltage 134 (e.g., $V_{RMP\_BUK}$) decreases with time.

In some embodiments, the signal 243 (e.g., CLK_BST) is received by the one-shot pulse generator 262, which in response generates a signal 263. For example, if the signal 263 (e.g., CLK_BST) changes from the logic low level to the logic high level, the one-shot pulse generator 262 changes the signal 263 from the logic low level to the logic high level, keeps the signal 263 at the logic high level for a predetermined time duration, and then changes the signal 263 back to the logic low level. In some examples, if the 263 is at the logic high level, the transistor 234 (e.g., M3) is turned on, and if the signal 263 is at the logic low level, the transistor 234 (e.g., M3) is turned off. For example, if the transistor 234 (e.g., M3) is turned off by the signal 263, the current source 214 (e.g., I3) charges the capacitor 224 (e.g., C3) and the ramp voltage 132 (e.g., $V_{RMP\_BST}$) increases with time. As an example, if the transistor 234 (e.g., M3) is turned on by the signal 263, the capacitor 224 (e.g., C3) is discharged and the ramp voltage 132 (e.g., $V_{RMP\_BST}$) decreases with time.

According to certain embodiments, the frequency of the clock signal 241 equals twice the frequency of the signal 243 (e.g., CLK_BST), and the frequency of the clock signal 241 equals twice the frequency of the signal 253 (e.g., CLK_BUK), with the following relationship:

$$\frac{I_1}{C_1} = 2 \times \frac{I_2}{C_2} = 2 \times \frac{I_3}{C_3} \qquad \text{(Equation 1)}$$

where $I_1$ represents the current generated by the current source 210, $I_2$ represents the current generated by the current source 212, and $I_3$ represents the current generated by the current source 214. Additionally, $C_1$ represents the capacitance of the capacitor 220, $C_2$ represents the capacitance of the capacitor 222, and $C_3$ represents the capacitance of the capacitor 224.

Figure 3:
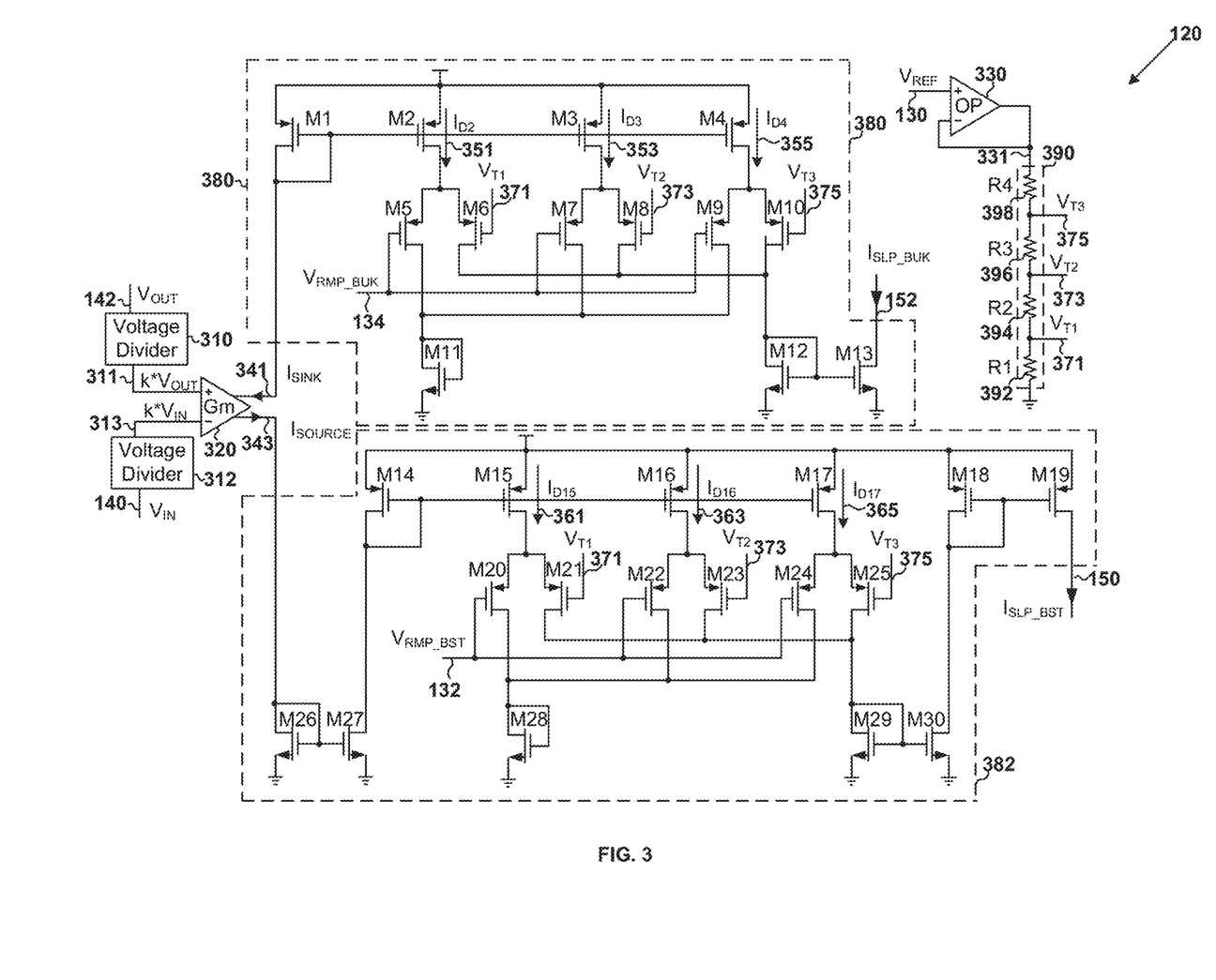
FIG. 3 is a simplified diagram showing the current generator as part of the compensation current generator as shown in FIG. 1 for a DC-to-DC voltage converter according to certain embodiments of the present invention.

FIG. 3 is a simplified diagram showing the current generator 120 as part of the compensation current generator 100 as shown in FIG. 1 for a DC-to-DC voltage converter according to certain embodiments of the present invention. This diagram is merely an example, which should not unduly limit the scope of the claims. One of ordinary skill in the art would recognize many variations, alternatives, and modifications. As shown in FIG. 3, the current generator 120 includes voltage dividers 310 and 312, a transconductance amplifier 320, an operational amplifier 330, current generators 380 and 382, and a voltage divider 390. Although the above has been shown using a selected group of components for the current generator 120, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the operational amplifier 330 receives the reference voltage 130 (e.g., $V_{REF}$) and in response generates a voltage 331. For example, the voltage 331 equals the reference voltage 130 (e.g., $V_{REF}$). As an example, the voltage 331 is received by the voltage divider 390. In certain examples, the voltage divider 390 includes a resistor 392 (e.g., R1), a resistor 394 (e.g., R2), a resistor 396 (e.g., R3), and a resistor 398 (e.g., R4). For example, the voltage divider 390 generates a threshold voltage 371 (e.g., $V_{T1}$), a threshold voltage 373 (e.g., $V_{T2}$), and a threshold voltage 375 (e.g., $V_{T3}$) based at least in part on the voltage 331. As an example, the threshold voltage 371 (e.g., $V_{T1}$) is smaller than the threshold voltage 373 (e.g., $V_{T2}$), and the threshold voltage 373 (e.g., $V_{T2}$) is smaller than the threshold voltage 375 (e.g., $V_{T3}$).

According to certain embodiments, the output voltage 142 (e.g., $V_{OUT}$) is received by the voltage divider 310, and the input voltage 140 (e.g., $V_{IN}$) is received by the voltage divider 312. For example, the voltage divider 310 generates a voltage 311 based at least in part on the output voltage 142 (e.g., $V_{OUT}$), and the voltage divider 312 generates a voltage 313 based at least in part on the input voltage 140 (e.g., $V_{IN}$). As an example, the voltage 311 equals the output voltage 142 (e.g., $V_{OUT}$) multiplied by a predetermined constant (e.g., k), and the voltage 313 equals the input voltage 140 (e.g., $V_{IN}$) multiplied by the predetermined constant (e.g., k), wherein the predetermined constant (e.g., k) is larger than zero and smaller than one.

According to some embodiments, the voltage 311 is received by a non-inverting input terminal (e.g., the "+" terminal) of the transconductance amplifier 320, and the voltage 313 is received by an inverting input terminal (e.g., the "−" terminal) of the transconductance amplifier 320. In certain examples, if the voltage 311 is smaller than the voltage 313, the transconductance amplifier 320 generates a current 341 based at least in part on the voltages 311 and 313, wherein the current 341 flows into the transconductance amplifier 320.

As an example, if the voltage 311 is larger than the voltage 313, the transconductance amplifier 320 generates a current 343 based at least in part on the voltages 311 and 313, wherein the current 343 flows out of the transconductance amplifier 320.

In certain embodiments, the current 341 flows into the transconductance amplifier 320 from the current generator 380. For example, the current 341 is used to generate a current 351 (e.g., $I_{D2}$), a current 353 (e.g., $I_{D3}$), and a current 355 (e.g., $I_{D4}$). As an example, based at least in part on the current 351 (e.g., $I_{D2}$), the current 353 (e.g., $I_{D3}$), and/or the current 355 (e.g., $I_{D4}$), the current generator 380 generates the compensation current 152 (e.g., $I_{SLP\_BUK}$), wherein the compensation current 152 (e.g., $I_{SLP\_BUK}$) flows into the current generator 380. In some examples, if the ramp voltage 134 (e.g., $V_{RMP\_BUK}$) is smaller than the threshold voltage 371 (e.g., $V_{T1}$), the compensation current 152 (e.g., $I_{SLP\_BUK}$) equals zero. In certain examples, if the ramp voltage 134 (e.g., $V_{RMP\_BUK}$) is larger than the threshold voltage 371 (e.g., $V_{T1}$) and smaller than the threshold voltage 373 (e.g., $V_{T2}$), the compensation current 152 (e.g., $I_{SLP\_BUK}$) equals the current 351 (e.g., $I_{D2}$) in magnitude. In some examples, if the ramp voltage 134 (e.g., $V_{RMP\_BUK}$) is larger than the threshold voltage 373 (e.g., $V_{T2}$) and smaller than the threshold voltage 375 (e.g., $V_{T3}$), the compensation current 152 (e.g., $I_{SLP\_BUK}$) equals the sum of the current 351 (e.g., $I_{D2}$) and the current 353 (e.g., $I_{D3}$) in magnitude. In certain examples, if the ramp voltage 134 (e.g., $V_{RMP\_BUK}$) is larger than the threshold voltage 375 (e.g., $V_{T3}$), the compensation current 152 (e.g., $I_{SLP\_BUK}$) equals the sum of the current 351 (e.g., $I_{D2}$), the current 353 (e.g., $I_{D3}$), and the current 355 (e.g., $I_{D4}$) in magnitude.

In some embodiments, the current 343 flows out of the transconductance amplifier 320 into the current generator 382. For example, the current 343 is used to generate a current 361 (e.g., $I_{D15}$), a current 363 (e.g., $I_{D16}$), and a current 365 (e.g., $I_{D17}$). As an example, based at least in part on the current 361 (e.g., $I_{D15}$), the current 363 (e.g., $I_{D16}$), and/or the current 365 (e.g., $I_{D17}$), the current generator 382 generates the compensation current 150 (e.g., $I_{SLP\_BST}$), wherein the compensation current 150 (e.g., $I_{SLP\_BST}$) flows out of the current generator 382. In certain examples, if the ramp voltage 132 (e.g., $V_{RMP\_BST}$) is smaller than the threshold voltage 371 (e.g., $V_{T1}$), the compensation current 150 (e.g., $I_{SLP\_BST}$) equals zero. In some examples, if the ramp voltage 132 (e.g., $V_{RMP\_BST}$) is larger than the threshold voltage 371 (e.g., $V_{T1}$) and smaller than the threshold voltage 373 (e.g., $V_{T2}$), the compensation current 150 (e.g., $I_{SLP\_BST}$) equals the current 361 (e.g., $I_{D15}$). In certain examples, if the ramp voltage 132 (e.g., $V_{RMP\_BST}$) is larger than the threshold voltage 373 (e.g., $V_{T2}$) and smaller than the threshold voltage 375 (e.g., $V_{T3}$), the compensation current 150 (e.g., $I_{SLP\_BST}$) equals the sum of the current 361 (e.g., $I_{D15}$) and the current 363 (e.g., $I_{D16}$) in magnitude. In some examples, if the ramp voltage 132 (e.g., $V_{RMP\_BST}$) is larger than the threshold voltage 375 (e.g., $V_{T3}$), the compensation current 150 (e.g., $I_{SLP\_BST}$) equals the sum of the current 361 (e.g., $I_{D15}$), the current 363 (e.g., $I_{D16}$), and the current 365 (e.g., $I_{D17}$) in magnitude.

Figure 4:
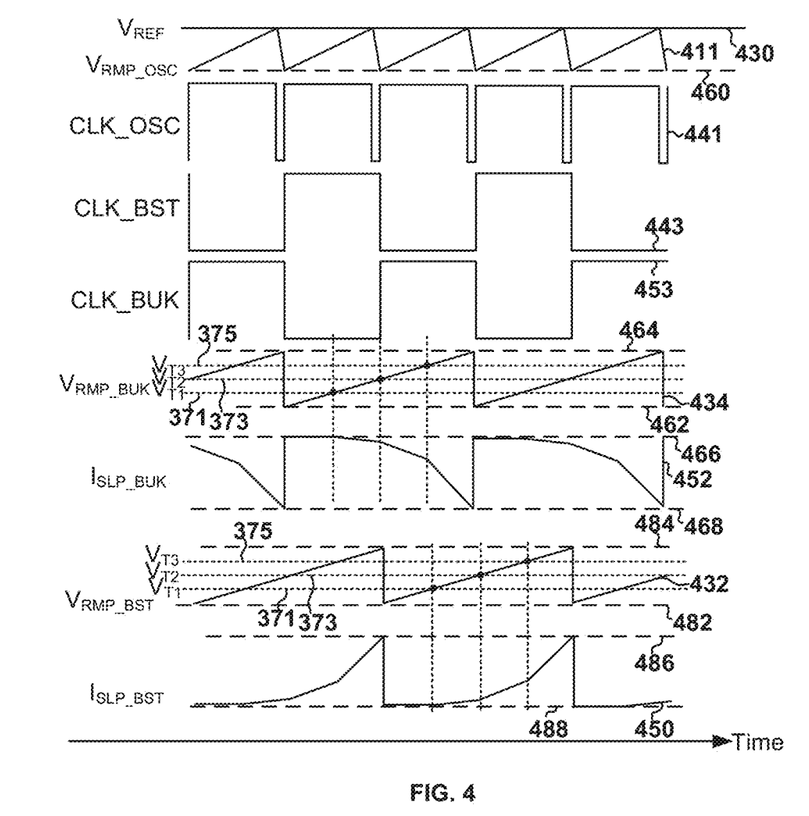
FIG. 4 shows simplified timing diagrams for the compensation current generator as shown in FIG. 1 that includes the voltage generator as shown in FIG. 2 and the current generator as shown in FIG. 3 according to some embodiments of the present invention.

FIG. 4 shows simplified timing diagrams for the compensation current generator 100 as shown in FIG. 1 that includes the voltage generator 110 as shown in FIG. 2 and the current generator 120 as shown in FIG. 3 according to some embodiments of the present invention. These diagrams are merely examples, which should not unduly limit the scope of the claims. One of ordinary skill in the art would recognize many variations, alternatives, and modifications. For example, the waveform 430 represents the reference voltage 130 (e.g., $V_{REF}$) as a function of time, the waveform 411 represents the ramp voltage 211 (e.g., $V_{RMP\_OSC}$) as a function of time, the waveform 441 represents the clock signal 241 (e.g., CLK_OSC) as a function of time, the waveform 443 represents the signal 243 (e.g., CLK_BST) as a function of time, and the waveform 453 represents the signal 253 (e.g., CLK_BUK) as a function of time. As an example, the waveform 434 represents the ramp voltage 134 (e.g., $V_{RMP\_BUK}$) as a function of time, the waveform 452 represents the compensation current 152 (e.g., $I_{SLP\_BUK}$) as a function of time, the waveform 432 represents the ramp voltage 132 (e.g., $V_{RMP\_BST}$) as a function of time, and the waveform 450 represents the compensation current 150 (e.g., $I_{SLP\_BST}$) as a function of time.

As shown by the waveform 411, during one period of the ramp voltage 211, the ramp voltage 211 (e.g., $V_{RMP\_OSC}$) increases from a minimum voltage 460 towards the reference voltage 130 represented by the waveform 430, and after the ramp voltage 211 (e.g., $V_{RMP\_OSC}$) reaches the reference voltage 130, the ramp voltage 211 (e.g., $V_{RMP\_OSC}$) decreases towards the minimum voltage 460 according to certain embodiments. For example, as shown by the waveform 441, during one period of the clock signal 241 (e.g., CLK_OSC), when the ramp voltage 211 (e.g., $V_{RMP\_OSC}$) increases from the minimum voltage 460 towards the reference voltage 130, the clock signal 241 (e.g., CLK_OSC) remains at a logic high level, and when the ramp voltage 211 (e.g., $V_{RMP\_OSC}$) decreases towards the minimum voltage 460, the clock signal 241 (e.g., CLK_OSC) remains at a logic low level. As an example, if the ramp voltage 211 (e.g., $V_{RMP\_OSC}$) drops to the minimum voltage 460, the clock signal 241 (e.g., CLK_OSC) changes from the logic low level to the logic high level, and if the ramp voltage 211 (e.g., $V_{RMP\_OSC}$) reaches the reference voltage 130, the clock signal 241 (e.g., CLK_OSC) changes from the logic high level to the logic low level.

As shown by the waveforms 443 and 453, during one period of the clock signal 241 (e.g., CLK_OSC), the signal 243 (e.g., CLK_BST) is at the logic low level and the signal 253 (e.g., CLK_BUK) is at the logic high level, and immediately after this period of the clock signal 241 (e.g., CLK_OSC), during another period of the clock signal 241 (e.g., CLK_OSC), the signal 243 (e.g., CLK_BST) is at the logic high level and the signal 253 (e.g., CLK_BUK) is at the logic low level, according to some embodiments. For example, the frequency of the signal 243 (e.g., CLK_BST) equals half of the frequency of the ramp voltage 211 (e.g., $V_{RMP\_OSC}$), and the frequency of the signal 253 (e.g., CLK_BUK) also equals half of the frequency of the ramp voltage 211 (e.g., $V_{RMP\_OSC}$). As an example, the duty cycle of the signal 243 (e.g., CLK_BST) is equal to 0.5, and the duty cycle of the signal 253 (e.g., CLK_BUK) is also equal to 0.5.

In certain embodiments, during one period of the signal 253 (e.g., CLK_BUK) that starts when the signal 253 (e.g., CLK_BUK) changes from the logic high level to the logic low level and ends when the signal 253 (e.g., CLK_BUK) again changes from the logic high level to the logic low level, the ramp voltage 134 (e.g., $V_{RMP\_BUK}$) increases from a minimum voltage 462 to a maximum voltage 142e 464, passing through the threshold voltage 371 (e.g., $V_{T1}$), the threshold voltage 373 (e.g., $V_{T2}$), and the threshold voltage 375 (e.g., $V_{T3}$), as shown by the waveform 434, and the magnitude of the compensation current 152 (e.g., $I_{SLP\_BUK}$) changes from a maximum current 466 to a minimum current 468 as shown by the waveform 452. For example, when the ramp voltage 134 (e.g., $V_{RMP\_BUK}$) is larger than the minimum voltage 462 and smaller than the threshold voltage 371 (e.g., $V_{T1}$), the magnitude of the compensation current 152 (e.g., $I_{SLP\_BUK}$) remains constant at a slope $S_0$ that is equal to zero. As an example, when the ramp voltage 134 (e.g., $V_{RMP\_BUK}$) is larger than the threshold voltage 371 (e.g., $V_{T1}$) and smaller than the threshold voltage 373 (e.g., $V_{T2}$), the magnitude of the compensation current 152 (e.g., $I_{SLP\_BUK}$) decreases with time at a slope $S_1$, wherein the slope $S_1$ is smaller than zero and the absolute value of the slope $S_1$ is equal to the slope $S_1$ multiplied by −1. For example, when the ramp voltage 134 (e.g., $V_{RMP\_BUK}$) is larger than the threshold voltage 373 (e.g., $V_{T2}$) and smaller than the threshold voltage 375 (e.g., $V_{T3}$), the magnitude of the compensation current 152 (e.g., $I_{SLP\_BUK}$) decreases with time at a slope $S_2$, wherein the slope $S_2$ is smaller than zero and the absolute value of the slope $S_2$ is equal to the slope $S_2$ multiplied by −1. As an example, when the ramp voltage 134 (e.g., $V_{RMP\_BUK}$) is larger than the threshold voltage 375 (e.g., $V_{T3}$) and is smaller than the maximum voltage 464, the magnitude of the compensation current 152 (e.g., $I_{SLP\_BUK}$) decreases with time at a slope $S_3$, wherein the slope $S_3$ is smaller than zero and the absolute value of the slope $S_3$ is equal to the slope $S_3$ multiplied by −1. In some examples, the slope $S_0$ is larger than the slope $S_1$, the slope $S_1$ is larger than the slope $S_2$, the slope $S_2$ is larger than the slope $S_3$. In certain examples, the absolute value of the slope $S_0$ is smaller than the absolute value of the slope $S_1$, the absolute value of the slope $S_1$ is smaller than the absolute value of the slope $S_2$, and the absolute value of the slope $S_2$ is smaller than the absolute value of the slope $S_3$.

In some embodiments, during one period of the signal 243 (e.g., CLK_BST) that starts when the signal 243 (e.g., CLK_BST) changes from the logic high level to the logic low level and ends when the signal 243 (e.g., CLK_BST) again changes from the logic high level to the logic low level, the ramp voltage 132 (e.g., $V_{RMP\_BST}$) increases from a minimum voltage 482 to a maximum voltage 484, passing through the threshold voltage 371 (e.g., $V_{T1}$), the threshold voltage 373 (e.g., $V_{T2}$), and the threshold voltage 375 (e.g., $V_{T3}$), as shown by the waveform 432, and the magnitude of the compensation current 150 (e.g., $I_{SLP\_BST}$) changes from a minimum current 488 to a maximum current 486 to as shown by the waveform 450. For example, when the ramp voltage 132 (e.g., $V_{RMP\_BST}$) is larger than the minimum voltage 482 and smaller than the threshold voltage 371 (e.g., $V_{T1}$), the magnitude of the compensation current 150 (e.g., $I_{SLP\_BST}$) remains constant at a slope $S_{10}$ that is equal to zero. As an example, when the ramp voltage 132 (e.g., $V_{RMP\_BST}$) is larger than the threshold voltage 371 (e.g., $V_{T1}$) and smaller than the threshold voltage 373 (e.g., $V_{T2}$), the magnitude of the compensation current 150 (e.g., $I_{SLP\_BST}$) increases with time at a slope $S_{11}$, wherein the slope $S_{11}$ is larger than zero and the absolute value of the slope $S_{11}$ is equal to the slope $S_{11}$. For example, when the ramp voltage 132 (e.g., $V_{RMP\_BST}$) is larger than the threshold voltage 373 (e.g., $V_{T2}$) and smaller than the threshold voltage 375 (e.g., $V_{T3}$), the magnitude of the compensation current 150 (e.g., $I_{SLP\_BST}$) increases with time at a slope $S_{12}$, wherein the slope $S_{12}$ is larger than zero and the absolute value of the slope $S_{12}$ is equal to the slope $S_{12}$. As an example, when the ramp voltage 132 (e.g., $V_{RMP\_BST}$) is larger than the threshold voltage 375 (e.g., $V_{T3}$) and is smaller than the maximum voltage 484, the magnitude of the compensation current 150 (e.g., $I_{SLP\_BST}$) increases with time at a slope $S_{13}$, wherein the slope $S_{13}$ is larger than zero and the absolute value of the slope $S_{13}$ is equal to the slope $S_{13}$. In some examples, the slope $S_{10}$ is smaller than the slope $S_{11}$, the slope $S_{11}$ is smaller than the slope $S_{12}$, the slope $S_{12}$ is smaller than the slope $S_{13}$. In certain examples, the absolute value of the slope $S_{10}$ is smaller than the absolute value of the slope $S_{11}$, the absolute value of the slope $S_{11}$ is smaller than the absolute value of the slope $S_{12}$, and the absolute value of the slope $S_{12}$ is smaller than the absolute value of the slope $S_{13}$.

Figure 5:
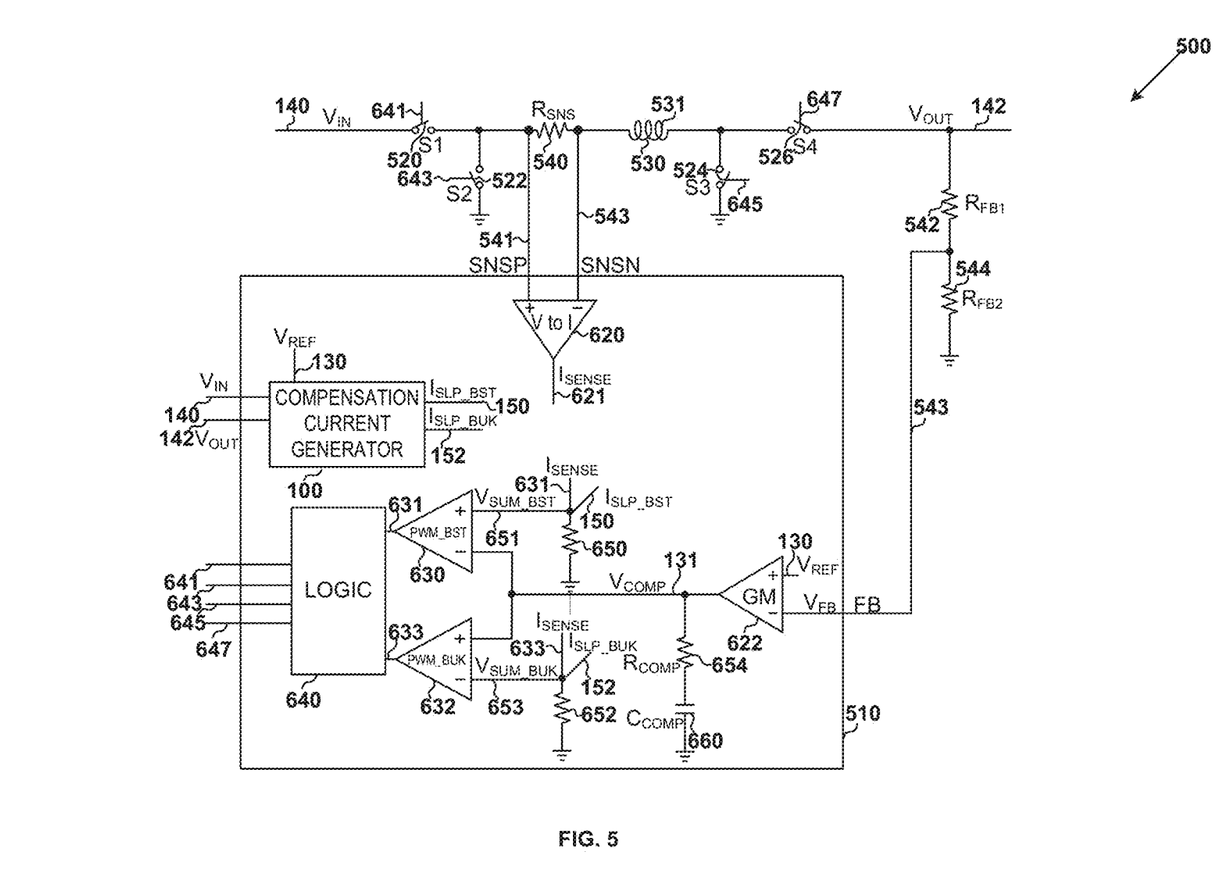
FIG. 5 is a simplified diagram showing a buck-boost converter that includes the compensation current generator as shown in FIG. 1 according to some embodiments of the present invention.

FIG. 5 is a simplified diagram showing a buck-boost converter that includes the compensation current generator 100 as shown in FIG. 1 according to some embodiments of the present invention. This diagram is merely an example, which should not unduly limit the scope of the claims. One of ordinary skill in the art would recognize many variations, alternatives, and modifications. The buck-boost converter 500 includes a buck-booster controller 510, a switch 520 (e.g., S1), a switch 522 (e.g., S2), a switch 524 (e.g., S3), a switch 526 (e.g., S4), a coil 530, a resistor 540 (e.g., $R_{SNS}$), a resistor 542 (e.g., $R_{FB1}$), a resistor 544 (e.g., $R_{FB2}$). For example, the buck-booster controller 510 includes the compensation current generator 100, transconductance amplifiers 620 and 622, comparators 630 and 632, a logic signal generator 640, resistors 650 and 652, a resistor 654 (e.g., $R_{COMP}$), and a capacitor 660 (e.g., $C_{COMP}$). As an example, the buck-boost converter 500 operates with a fixed frequency. Although the above has been shown using a selected group of components for the buck-boost converter 500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 5, the buck-boost converter 500 receives the input voltage 140 and generates the output voltage 142 based at least in part on the input voltage 140 according to certain embodiments. For example, the resistor 542 (e.g., $R_{FB1}$) and the resistor 544 (e.g., $R_{FB2}$) are parts of a voltage divider, which receives the output voltage 142 and generates a feedback voltage 543. In some examples, the feedback voltage 543 is received by a non-inverting input terminal (e.g., the "+" terminal) of the transconductance amplifier 622, which also includes an inverting input terminal (e.g., the "−" terminal) and an output terminal. For example, the inverting input terminal (e.g., the "−" terminal) of the feedback voltage 543 receives the reference voltage 130 (e.g., $V_{REF}$). As an example, the output terminal of the transconductance amplifier 622 is coupled to one terminal of the resistor 654 (e.g., $R_{COMP}$). In certain examples, another terminal of the resistor 654 (e.g., $R_{COMP}$) is connected to one terminal of the capacitor 660 (e.g., $C_{COMP}$). For example, another terminal of the capacitor 660 (e.g., $C_{COMP}$) is biased to the ground voltage.

According to some embodiments, the output terminal of the transconductance amplifier 622 is biased to a voltage 131 (e.g., $V_{COMP}$), which is received by an inverting input terminal (e.g., the "−" terminal) of the comparator 630 (e.g., PWM_BST) and a non-inverting input terminal (e.g., the "+" terminal) of the comparator 632 (e.g., PWM_BUK). In certain examples, the resistor 540 (e.g., $R_{SNS}$) is connected in series with the coil 530. For example, one terminal of the resistor 540 (e.g., $R_{SNS}$) provides a voltage 541 to a non-inverting input terminal of the transconductance amplifier 620, and another terminal of the resistor 540 (e.g., $R_{SNS}$) provides a voltage 543 to an inverting input terminal of the transconductance amplifier 620. As an example, the transconductance amplifier 620 determines the voltage 541 minus the voltage 543, wherein the voltage 541 minus the voltage 543 represents a coil current 531 that flows through the coil 530. In some examples, based at least in part on the information associated with the coil current 531 that flows through the coil 530, the transconductance amplifier 620 generates a current 621 (e.g., $I_{SENSE}$).

In certain embodiments, the current 621 (e.g., $I_{SENSE}$) is the same as a current 631 in magnitude and direction, and the current 621 (e.g., $I_{SENSE}$) is also the same as a current 633 in magnitude and direction. For example, the current 631 flows through the resistor 650 to the ground, and the current 633 flows through the resistor 652 to the ground. As an example, the compensation current 150 (e.g., $I_{SLP\_BST}$) also flows through the resistor 650 to the ground, and the compensation current 152 (e.g., $I_{SLP\_BUK}$) also flows through the resistor 652 to the ground.

In some embodiments, the currents 631 and 150 that flows through the resistor 650 generates a voltage 651 (e.g., $V_{SUM\_BST}$), and the currents 633 and 152 that flows through the resistor 652 generates a voltage 653 (e.g., $V_{SUM\_BUK}$). For example, the voltage 651 (e.g., $V_{SUM\_BST}$) is received by the non-inverting input terminal (e.g., the "+" terminal) of the comparator 630. As an example, the voltage 653 (e.g., $V_{SUM\_BUK}$) is received by the inverting input terminal (e.g., the "−" terminal) of the comparator 632. In some examples, the comparator 630 generates a comparison signal 631 based at least in part on the voltage 651 (e.g., $V_{SUM\_BST}$) and the voltage 131 (e.g., $V_{COMP}$). In certain examples, the comparator 632 generates a comparison signal 633 based at least in part on the voltage 131 (e.g., $V_{COMP}$) and the voltage 653 (e.g., $V_{SUM\_BUK}$).

According to certain embodiments, the comparison signals 631 and 633 are received by the logic signal generator 640, which in response generate logic signals 641, 643, 645, and 647. For example, the logic signal 641 is used to open and/or close the switch 520 (e.g., S1), and the logic signal 643 is used to open and/or close the switch 522 (e.g., S2). As an example, the logic signal 645 is used to open and/or close the switch 540 (e.g., S3), and the logic signal 647 is used to open and/or close the switch 526 (e.g., S4). In certain embodiments, based at least in part on the logic signals 641, 643, 645, and 647, the buck-boost converter 500 converts the input voltage 140 to the output voltage 142. For example, the input voltage 140 to the output voltage 142 are received by the compensation current generator 100, which generates the compensation current 150 (e.g., $I_{SLP\_BST}$) and the compensation current 152 (e.g., $I_{SLP\_BUK}$). As an example, the compensation current 150 (e.g., $I_{SLP\_BST}$) and the compensation current 152 (e.g., $I_{SLP\_BUK}$) are used to generate the logic signals 641, 643, 645, and 647.

According to some embodiments, based at least in part on the information associated with the coil current 531 that flows through the coil 530, the transconductance amplifier 620 generates the current 621 (e.g., $I_{SENSE}$), which represents the coil current 531. For example, when the buck-boost converter 500 operates under the boost mode (e.g., when the output voltage 142 is larger than the input voltage 140), the compensation current 150 (e.g., $I_{SLP\_BST}$) is used to compensate the current 631, which is the same as the current 621 (e.g., $I_{SENSE}$) in magnitude and direction. As an example, when the buck-boost converter 500 operates under the buck mode (e.g., when the output voltage 142 is smaller than the input voltage 140), the compensation current 152 (e.g., $I_{SLP\_BUK}$) is used to compensate the current 633, which is the same as the current 621 (e.g., $I_{SENSE}$) in magnitude and direction. In certain examples, the compensation provided by the compensation current 150 (e.g., $I_{SLP\_BST}$) and/or the compensation current 152 (e.g., $I_{SLP\_BUK}$) reduces (e.g., eliminates) sub-harmonic oscillation of the buck-boost converter 500.

Certain embodiments of the present invention provide a DC-to-DC voltage converter (e.g., the buck-boost converter 500) that can convert a wide range of input voltage to a wide range of output voltage and also can provide a high power to the load of the DC-to-DC voltage converter. For example, the slope of the compensation current 152 (e.g., $I_{SLP\_BUK}$) changes with the ramp voltage 134 (e.g., $V_{RMP\_BUK}$). As an example, the slope of the compensation current 150 (e.g., $I_{SLP\_BST}$) changes with the ramp voltage 132 (e.g., $V_{RMP\_BST}$).

According to some embodiments, a system for generating one or more compensation currents for a DC-to-DC voltage converter includes: a voltage generator configured to receive a reference voltage and generate a first ramp voltage and a second ramp voltage based at least in part on the reference voltage; and a current generator configured to receive the first ramp voltage, the second ramp voltage, an input voltage, and an output voltage; wherein the current generator is further configured to: if the output voltage is smaller than the input voltage, generate a first compensation current based at least in part on the first ramp voltage; and if the output voltage is larger than the input voltage, generate a second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage. For example, the system for generating one or more compensation currents is implemented according to at least FIG. 1.

As an example, the input voltage is an input voltage of the DC-to-DC voltage converter; and the output voltage is an output voltage of the DC-to-DC voltage converter. For example, the first compensation current flows into the current generator; and the second compensation current flows out of the current generator. As an example, the first compensation current decreases with time at the first variable slope, the first variable slope being equal to or smaller than zero; and the absolute value of the first variable slope increases with the first ramp voltage. For example, the current generator is further configured to receive the reference voltage and generate one or more threshold voltages based at least in part on the reference voltage. As an example, the current generator is further configured to, if the first ramp voltage becomes larger than one threshold voltage of the one or more threshold voltages, change the absolute value of the first variable slope from a first value to a second value; wherein: the first value is equal to or larger than zero; and the second value is larger than the first value. For example, the second compensation current increases with time at the second variable slope, the second variable slope being equal to or larger than zero; and the absolute value of the second variable slope increases with the second ramp voltage. As an example, the current generator is further configured to receive the reference voltage and generate one or more threshold voltages based at least in part on the reference voltage. For example, the current generator is further configured to, if the second ramp voltage becomes larger than one threshold voltage of the one or more threshold voltages, change the absolute value of the second variable slope from a first value to a second value; wherein: the first value is equal to or larger than zero; and the second value is larger than the first value.

According to certain embodiments, a controller for a DC-to-DC voltage converter includes: a compensation current generator configured to receive a reference voltage, an input voltage and an output voltage and generate the first compensation current and the second compensation current based at least in part on the reference voltage, the input voltage and the output voltage; and a logic signal generator configured to generate one or more logic signals based on at least information associated with the first compensation current and the second compensation current; wherein the compensation current generator is further configured to: generate a first ramp voltage and a second ramp voltage based at least in part on the reference voltage; if the output voltage is smaller than the input voltage, generate the first compensation current based at least in part on the first ramp voltage; and if the output voltage is larger than the input voltage, generate the second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage. For example, the controller is implemented according to at least FIG. 5 and/or FIG. 1.

As an example, the input voltage is an input voltage of the DC-to-DC voltage converter; and the output voltage is an output voltage of the DC-to-DC voltage converter. For example, the first compensation current flows into the compensation current generator; and the second compensation current flows out of the compensation current generator.

According to some embodiments, a method for generating one or more compensation currents for a DC-to-DC voltage converter includes: receiving a reference voltage; generating a first ramp voltage and a second ramp voltage based at least in part on the reference voltage; receiving the first ramp voltage, the second ramp voltage, an input voltage, and an output voltage; if the output voltage is smaller than the input voltage, generating a first compensation current based at least in part on the first ramp voltage; and if the output voltage is larger than the input voltage, generating a second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage. For example, the method for generating one or more compensation currents is implemented according to at least FIG. 1.

As an example, the input voltage is an input voltage of the DC-to-DC voltage converter; and the output voltage is an output voltage of the DC-to-DC voltage converter. For example, the first compensation current decreases with time al the first variable slope, the first variable slope being equal to or smaller than zero; and the absolute value of the first variable slope increases with the first ramp voltage. As an example, the method further includes: receiving the reference voltage; and generating one or more threshold voltages based at least in part on the reference voltage. For example, the method further includes: if the first ramp voltage becomes larger than one threshold voltage of the one or more threshold voltages, changing the absolute value of the first variable slope from a first value to a second value; wherein: the first value is equal to or larger than zero; and the second value is larger than the first value. As an example, the second compensation current increases with time at the second variable slope, the second variable slope being equal to or larger than zero; and the absolute value of the second variable slope increases with the second ramp voltage. For example, the method further includes: receiving the reference voltage; and generating one or more threshold voltages based at least in part on the reference voltage. As an example, the method further includes: if the second ramp voltage becomes larger than one threshold voltage of the one or more threshold voltages, changing the absolute value of the second variable slope from a first value to a second value; wherein: the first value is equal to or larger than zero; and the second value is larger than the first value.

According to certain embodiments, a method for a DC-to-DC voltage converter includes: receiving a reference voltage, an input voltage and an output voltage; generating the first compensation current and the second compensation current based at least in part on the reference voltage, the input voltage and the output voltage; processing information associated with the first compensation current and the second compensation current; and generating one or more logic signals based on at least information associated with the first compensation current and the second compensation current; wherein the generating the first compensation current and the second compensation current based at least in part on the reference voltage, the input voltage and the output voltage includes: generating a first ramp voltage and a second ramp voltage based at least in part on the reference voltage; if the output voltage is smaller than the input voltage, generating the first compensation current based at least in part on the first ramp voltage; and if the output voltage is larger than the input voltage, generating the second compensation current based at least in part on the second ramp voltage; wherein: the first compensation current changes with time at a first variable slope; and the first variable slope changes with the first ramp voltage; wherein: the second compensation current changes with time at a second variable slope; and the second variable slope changes with the second ramp voltage. For example, the method is implemented according to at least FIG. 5 and/or FIG. 1. As an example, the input voltage is an input voltage of the DC-to-DC voltage converter; and the output voltage is an output voltage of the DC-to-DC voltage converter.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for generating one or more compensation currents for a DC-to-DC voltage converter, the system comprising:
   a voltage generator configured to receive a reference voltage and generate a first ramp voltage and a second ramp voltage based at least in part on the reference voltage; and
   a current generator configured to receive the first ramp voltage, the second ramp voltage, an input voltage, and an output voltage;
   wherein the current generator is further configured to:
      if the output voltage is smaller than the input voltage, generate a first compensation current based at least in part on the first ramp voltage; and
      if the output voltage is larger than the input voltage, generate a second compensation current based at least in part on the second ramp voltage;
   wherein:
      the first compensation current changes with time at a first variable slope; and
      the first variable slope changes with the first ramp voltage;
   wherein:
      the second compensation current changes with time at a second variable slope; and
      the second variable slope changes with the second ramp voltage;
   wherein the current generator is further configured to receive the reference voltage and generate one or more threshold voltages based at least in part on the reference voltage.

2. The system of claim 1 wherein:
   the input voltage is an input voltage of the DC-to-DC voltage converter; and
   the output voltage is an output voltage of the DC-to-DC voltage converter.

3. The system of claim 1 wherein:
   the first compensation current flows into the current generator; and
   the second compensation current flows out of the current generator.

4. The system of claim 1 wherein:
   the first compensation current decreases with time at the first variable slope, the first variable slope being equal to or smaller than zero; and
   the absolute value of the first variable slope increases with the first ramp voltage.

5. The system of claim 4 wherein:
   the current generator is further configured to, if the first ramp voltage becomes larger than one threshold voltage of the one or more threshold voltages, change the absolute value of the first variable slope from a first value to a second value;
   wherein:
      the first value is equal to or larger than zero; and
      the second value is larger than the first value.

6. The system of claim 1 wherein:
   the second compensation current increases with time at the second variable slope, the second variable slope being equal to or larger than zero; and
   the absolute value of the second variable slope increases with the second ramp voltage.

7. The system of claim 6 wherein:
   the current generator is further configured to, if the second ramp voltage becomes larger than one threshold voltage of the one or more threshold voltages, change the absolute value of the second variable slope from a first value to a second value;
wherein:
the first value is equal to or larger than zero, and the second value is larger than the first value.

8. A controller for a DC-to-DC voltage converter, the controller comprising:
a compensation current generator configured to receive a reference voltage, an input voltage and an output voltage and generate the first compensation current and the second compensation current based at least in part on the reference voltage, the input voltage and the output voltage; and
a logic signal generator configured to generate one or more logic signals based on at least information associated with the first compensation current and the second compensation current;
wherein the compensation current generator is further configured to:
generate a first ramp voltage and a second ramp voltage based at least in part on the reference voltage;
if the output voltage is smaller than the input voltage, generate the first compensation current based at least in part on the first ramp voltage; and
if the output voltage is larger than the input voltage, generate the second compensation current based at least in part on the second ramp voltage;
wherein:
the first compensation current changes with time at a first variable slope; and
the first variable slope changes with the first ramp voltage;
wherein:
the second compensation current changes with time at a second variable slope; and
the second variable slope changes with the second ramp voltage;
wherein the compensation current generator is further configured to generate one or more threshold voltages based at least in part on the reference voltage.

9. The controller of claim 8 wherein:
the input voltage is an input voltage of the DC-to-DC voltage converter; and
the output voltage is an output voltage of the DC-to-DC voltage converter.

10. The controller of claim 8 wherein:
the first compensation current flows into the compensation current generator; and
the second compensation current flows out of the compensation current generator.

11. A method for generating one or more compensation currents for a DC-to-DC voltage converter, the method comprising:
receiving a reference voltage;
generating a first ramp voltage and a second ramp voltage based at least in part on the reference voltage;
receiving the first ramp voltage, the second ramp voltage, an input voltage, and an output voltage;
if the output voltage is smaller than the input voltage, generating a first compensation current based at least in part on the first ramp voltage;
if the output voltage is larger than the input voltage, generating a second compensation current based at least in part on the second ramp voltage; and
generating one or more threshold voltages based at least in part on the reference voltage;

wherein:
the first compensation current changes with time at a first variable slope; and
the first variable slope changes with the first ramp voltage;
wherein:
the second compensation current changes with time at a second variable slope; and
the second variable slope changes with the second ramp voltage.

12. The method of claim 11 wherein:
the input voltage is an input voltage of the DC-to-DC voltage converter; and
the output voltage is an output voltage of the DC-to-DC voltage converter.

13. The method of claim 11 wherein:
the first compensation current decreases with time at the first variable slope, the first variable slope being equal to or smaller than zero; and
the absolute value of the first variable slope increases with the first ramp voltage.

14. The method of claim 13, and further comprising:
if the first ramp voltage becomes larger than one threshold voltage of the one or more threshold voltages, changing the absolute value of the first variable slope from a first value to a second value;
wherein:
the first value is equal to or larger than zero; and
the second value is larger than the first value.

15. The method of claim 11 wherein:
the second compensation current increases with time at the second variable slope, the second variable slope being equal to or larger than zero; and
the absolute value of the second variable slope increases with the second ramp voltage.

16. The method of claim 15, and further comprising:
if the second ramp voltage becomes larger than one threshold voltage of the one or more threshold voltages, changing the absolute value of the second variable slope from a first value to a second value;
wherein:
the first value is equal to or larger than zero; and
the second value is larger than the first value.

17. A method for a DC-to-DC voltage converter, the method comprising:
receiving a reference voltage, an input voltage and an output voltage;
generating the first compensation current and the second compensation current based at least in part on the reference voltage, the input voltage and the output voltage;
processing information associated with the first compensation current and the second compensation current; and
generating one or more logic signals based on at least information associated with the first compensation current and the second compensation current;
wherein the generating the first compensation current and the second compensation current based at least in part on the reference voltage, the input voltage and the output voltage includes:
generating a first ramp voltage and a second ramp voltage based at least in part on the reference voltage;
if the output voltage is smaller than the input voltage, generating the first compensation current based at least in part on the first ramp voltage; and if the output voltage is larger than the input voltage, generating the second compensation current based at least in part on the second ramp voltage;

wherein:
the first compensation current changes with time at a first variable slope; and
the first variable slope changes with the first ramp voltage;

wherein:
the second compensation current changes with time at a second variable slope; and
the second variable slope changes with the second ramp voltage;

wherein the generating the first compensation current and the second compensation current based at least in part on the reference voltage, the input voltage and the output voltage further includes:
generating one or more threshold voltages based at least in part on the reference voltage.

18. The method of claim 17 wherein:
the input voltage is an input voltage of the DC-to-DC voltage converter; and
the output voltage is an output voltage of the DC-to-DC voltage converter.

* * * * *